United States Patent [19]

Ohm

[11] 4,044,274
[45] Aug. 23, 1977

[54] TRANSMISSION SYSTEM

[75] Inventor: Werner Ohm, Hamburg, Germany

[73] Assignee: Stephan-Werke GmbH & Co., Hameln, Weser, Germany

[21] Appl. No.: 595,978

[22] Filed: July 14, 1975

[30] Foreign Application Priority Data

July 19, 1974 Germany .............................. 2434834

[51] Int. Cl.² ...................... F16H 33/00; F16H 37/02; H02K 3/42; H02K 7/10
[52] U.S. Cl. ....................................... 310/83; 74/640; 74/798; 310/86
[58] Field of Search ......................... 74/640, 798, 804; 310/82, 83, 85, 86, 162, 168

[56] References Cited

U.S. PATENT DOCUMENTS

| 2,932,986 | 4/1960 | Musser | 74/640 X |
| 2,956,188 | 10/1960 | White | 310/83 X |
| 3,169,202 | 2/1965 | Proctor et al. | 74/640 X |
| 3,229,130 | 1/1966 | Drouard | 310/86 X |
| 3,231,768 | 1/1966 | Dannenmann | 310/86 |
| 3,239,699 | 3/1966 | Ferrary | 74/640 X |
| 3,311,766 | 3/1967 | Scott | 74/640 X |
| 3,366,813 | 1/1968 | Madsen | 310/86 X |
| 3,427,898 | 2/1969 | Mayer | 74/640 |
| 3,495,108 | 2/1970 | Van Buskirk | 310/83 X |
| 3,561,006 | 2/1971 | Humphreys | 310/82 |

Primary Examiner—Samuel Scott
Assistant Examiner—Carl F. Pietruszka
Attorney, Agent, or Firm—Michael J. Striker

[57] ABSTRACT

A transmission system includes an electrical power unit having a rotor mounted on a shaft which rotates at a predetermined speed and a stator defining a gap with the rotor, and a step-down speed-reducing unit. The speed-reducing unit includes a flexible sleeve extending through the gap and having adjacent one axial end of the rotor a first set of teeth, an eccentric element mounted on the shaft axially adjacent the rotor for rotation within the sleeve so as to impart the eccentricity of the eccentric element to the flexible sleeve as the shaft rotates, and an annular member having a second set of teeth which mesh with the first set, the numbers of teeth in the two sets being different from one another.

6 Claims, 2 Drawing Figures

TRANSMISSION SYSTEM

BACKGROUND OF THE INVENTION

The present invention relates to a transmission system, and more particularly to a power-transmission arrangement which couples an electrical power unit to a step-down speed-reducing unit.

In the prior art, power units, such as electromotors, are provided with a conventional gear wheel transmission which reduces the relatively high rotational speeds of the electromotor to a desired lower value.

The material constants of the iron core laminations and of the winding, as well as the size of the air-gap formed between the stator and the rotor, impose limitations on the upper value of the magnitude of electrical energy which can be converted in a motor of a given volume, i.e. the energy density which can be converted is limited. The amount of electrical power which can be converted using a given volume, therefore is directly proportional to the rotational speed of the motor; for example, if a two-pole synchronous motor is connected to a 60 Hz, three-phase AC power supply, it will revolve at a speed of 3,600 rpm. This is the highest possible speed for direct connection to the 60 Hz power supply. The overall size of a four-pole motor, for example, which would revolve at 1,800 rpm, would have to be considerably increased for the same hp-delivery.

Since the energy density for the power transmitted between the teeth of a pair of transmission gear wheels is a multiple higher than that of the electromechanical conversion factor, the combination of a motor having a relatively high speed coupled with a gear-wheel transmission generally leads to the smallest-sized and most economical transmission arrangement of small and/or medium-sized drives with output speeds of less than 450 rpm.

In heavy-duty operation, noise reduction is an important consideration. A motor having two poles, i.e. having high rotational speed, requires a relatively high expenditure of money, labor and materials in order to dampen the resulting air noise and the noise resulting from magnetic forces in the motor. A gear-wheel transmission which is directly connected to a high-speed motor likewise requires to be noise-dampened to meet given noise dampening requirements. Nevertheless, for low output speed it is considerably cheaper and requires less volume to use a high speed motor with speed reduction gears rather than to use a motor of high number of poles, which produces the low speed without additional gears. It is particularly advantageous to have a small number of gear wheels in order to reduce the size, the noise and the price of the transmission system.

In order to optimize the magnitude of the electrical power to be efficiently converted and the desired low speed of rotation output with such considerations as volume, noise, weight and price, various trade-offs must be made amongst the following factors:

1. Heavy-duty operation and high speed of the power unit are desired in order to maximize the efficiency of operation.

2. In order to save space, the increased air noise and higher magnetic noise of motors having high energy density, must be accepted or else, increased expenditures for damping such noises are necessary.

3. A multi-staged gear-transmission system means that each additional stage increases the cost, worsens the efficiency and increases the volume since the energy must be converted in full at each stage.

In the prior art, the general theory of operation of a harmonic drive gear is known. See, for example, German patent PS 1,135,259, Issued Mar. 7, 1963 wherein an elliptical element deforms a steel sleeve having external teeth gearing. A steel ring has internal teeth gearing which meshes with the external teeth. The number of internal teeth on the steel ring is more than the number provided on the sleeve so that speed-reduction can be realized. Moreover, since the sleeve has fewer teeth, its diameter is correspondingly smaller than the diameter of the surrounding steel ring so that the sleeve can fit within the ring, and both sets of teeth can mesh. Typically, the region of meshing engagement is such that, at any one particular moment for the preferred diameters if the sleeve and ring, the number of teeth in mutual engagement with each other is about 15% of the entire number of teeth. The elliptical element imparts its curvature to the sleeve.

In the prior art, whenever it is desired to connect a harmonic drive gear, i.e. the elliptical element, to an electrical power unit, the harmonic drive gear is always connected to the output end of the shaft of the power unit; in other words, the gear is located externally of the power unit housing. This increases the axial distance between the harmonic gear and the electrical power unit and results in a relatively large-sized transmission system which, in turn, results in the aforementioned disadvantages.

SUMMARY OF THE INVENTION

Accordingly, it is the general object of the present invention to overcome the disadvantages of the prior art.

More particularly, it is an object of the present invention to shorten the coupling distance previously required in power unit-speed-reducer transmission systems.

Another object is to improve the air noise and magnetic noise characteristics of a power unit-speed-reducer transmission system.

A further object is to build a simple transmission system which is compact, economical and efficient in its operation.

In keeping with these objects and others which will become apparent hereinafter, one feature of the novel transmission system is a power unit having a rotor mounted on a shaft which rotates at a predetermined speed, and a stator defining a gap with the rotor. Mechanically coupled to the power unit is a step-down gearing means for reducing the predetermined speed of the power unit. The step-down gearing means includes a rotary flexible sleeve extending through the gap and having a first set of teeth axially adjacent one end of the rotor, an eccentric element mounted on the shaft also axially adjacent the rotor for rotation within the sleeve, so as to impart the eccentricity of the eccentric element to the flexible sleeve as the shaft rotates, and an annular member having a second set of teeth in meshing engagement with the first set. The second set has a greater number of teeth than the first set so as to step down the predetermined speeds of the rotor of the power unit to a lower rotational speed of the sleeve.

The layout and arrangement of the various component elements of the invention achieves the aforementioned objects and overcomes the prior art disadvantages in a simple but novel manner. The flexible sleeve extends through the heretofore unused air-gap. The eccentric element or harmonic drive gear is mounted within the sleeve, rather than connecting the eccentric element immediately at the output end of the shaft of the electrical power unit. This assures that the axial coupling distance will be much shorter than that previously achieved in the prior art, and that the size of the transmission system is, in turn, reduced.

The novel construction is achieved by introducing the flexible sleeve into the electrical power unit, and more particularly into the air gap. This feature is believed to be especially novel inasmuch as, in the prior art, the air gap is generally made as narrow as possible in order to maximize efficiency and thereby minimize magnetic energy losses wich will reduce the turning moment or torque of the power unit. The present invention actually slightly increases the air gap between the stator and the rotor in order to accomodate the non-magnetic flexible sleeve therein.

However, extensive experiments have been made and the energy losses resulting from increasing the air gap and by introducing a non-magnetic sleeve, made for example out of stainless steel, therein have proved to be small. The test results show that even an increase in the size of the air gap of a test motor by a factor of 10 causes only about a 30% loss of electrical energy.

The present invention thus possesses a relatively high step-down conversion ratio, and a small housing volume. The electrical energy generated is handled efficiently by the step-down gearing, despite the small reduction caused by the increase in size of the air gap. The radiated magnetic noise of the power unit is also considerably reduced by the above-described construction. In order to further prevent noise, the transmission system may be completely shielded by a housing.

A further feature of the present invention is to provide anti-friction means interposed between the sleeve and the eccentric element. The anti-friction means may be ball or roller bearings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
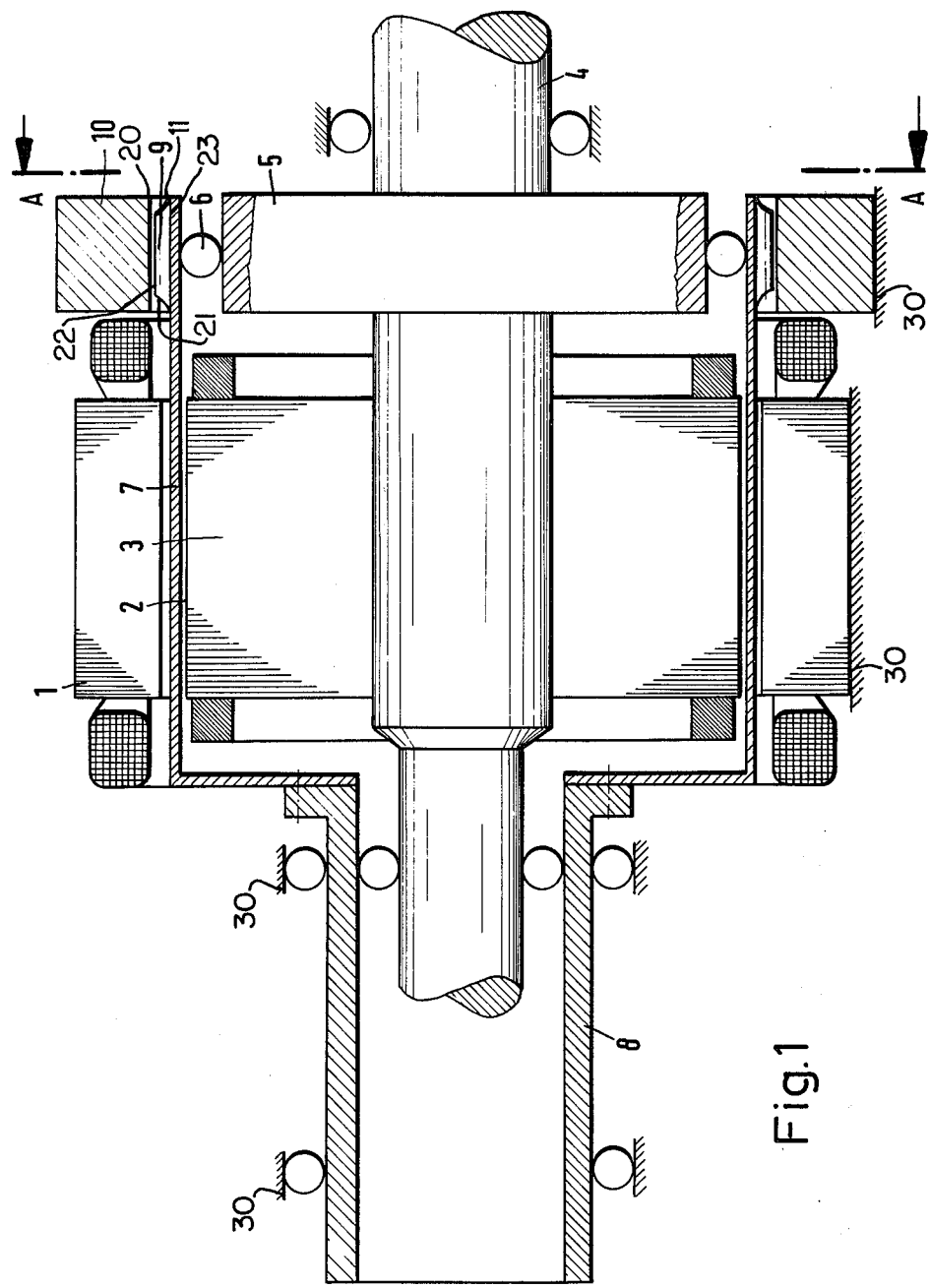
FIG. 1 is a partially-sectioned, partially broken-away view of an exemplary embodiment of a transmission system according to the present invention.

Discussing the exemplary embodiment illustrated in FIG. 1, it will be seen that reference numeral 1 identifies a stator or a power unit having a rotor 3 mounted on a rotating shaft 4 (partially shown). The shaft 4 has a driving 4 input end (at the right side of FIG. 1), and a driven end which is aligned and provided within rotatable output member 8 mounted on housing 30.

The power unit may be any electrical motor, such as an asynchronous motor, or generator, or any like device having a shaft 4 which rotates at a predetermined speed. For example, if the power unit is a two-pole synchronous motor and is connected to a 60 Hz, 3-phase AC source of current, then the rotor and the shaft 4 will rotate at 3,600 rpm. The stator 1 is mounted exteriorly of the rotor 3 and defines a generally cylindrical gap 2 therewith. The gap normally contains air and magnetic lines of flux.

A step-down gearing means for reducing the aforementioned speed of the power unit or electrical machine is provided axially adjacent the rotor 3. The step-down gearing means includes a flexible sleeve 7 which extends through the gap 2 and is mounted on output member 8 for rotation therewith. The sleeve 7 is constituted of any non-magnetic, elastic material. The wider air gap aids in reducing magnetic noise. The flexible sleeve 7 has an external first set of annular teeth 9 located at its axial end opposite to output member 8. The axial length of the sleeve 7 is preferably selected to be about 12 percent smaller than its outer diameter for structural reasons.

The gearing means further includes an eccentric element or harmonic drive gear 5 which is mounted on the shaft 4 for rotation within the sleeve 7. The eccentric element 5 may be shaped as an ellipse, i.e., its curvature has a major and a minor axis arranged normal with respect to each other, or it may have a plurality of axes arranged at angles other than 90°. The essential characteristic is that the eccentric element 5 be out-of-round, thereby defining an eccentric path as the shaft 4 rotates.

The eccentric element 5 may bear directly against the inner circumferential surface of the flexible sleeve 7, or anti-friction means 6 may be interposed between the flexible sleeve 7 and the eccentric element 5. The anti-friction means 6 may be ball bearings, roller bearings, or like means which serves to reduce friction between movable members.

The step-down gearing means also includes an annular member or ring 10 surrounding the axial end of the flexible sleeve 7 which is provided with the aforementioned external teeth 9. The ring 10 has its axis axially aligned with the axis of the stator 1 and is securely connected thereto. The ring 10 has an internal second set of annular teeth 11 which has a greater number of teeth than the first set of teeth 9. Both sets of teeth are adapted to have respective portions thereof in meshing engagement with each other so as to convert the electrical energy of the power unit to mechanical energy, and vice-versa.

The transmission system is operative as follows:

As the rotor 3 and shaft 4 of the power unit rotates, the eccentricity of the eccentric element 5 is imparted, either directly or through the intermediary of the anti-friction means 6, to the flexible sleeve 7. The first set of external teeth 9 will thereby engage circumferentially successive teeth of the second set of internal teeth 11. The speed-conversion ratio can be calculated by dividing the difference between the number of teeth of the two sets of teeth by the number of teeth on the first set. For example, if the ring 10 has 200 internal teeth and the flexible sleeve 7 has 198 external teeth, then the speed-reduction or conversion factor is 2/198 or 1:99.

Figure 2:
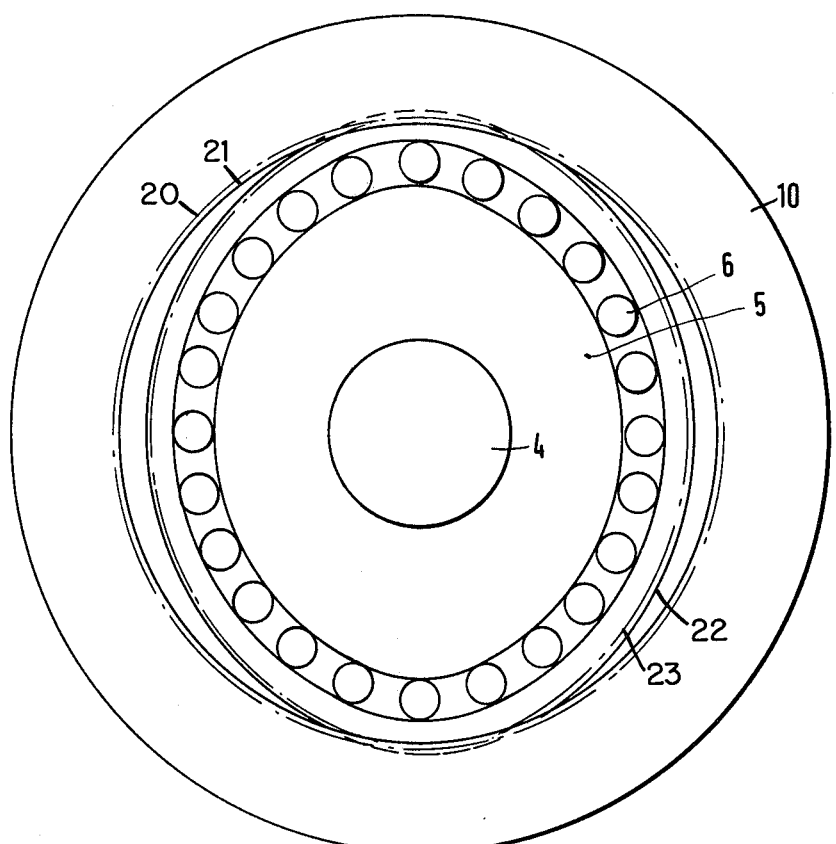
FIG. 2 is a view of FIG. 1 as seen along the line A—A.

Referring now to FIG. 2 which is a view of FIG. 1 as seen along the line A—A, it will be seen that an elliptical ball bearing race 6 serves to reduce the friction between the eccentric element 5 and the flexible sleeve 7. Four tracings are shown to illustrate the paths taken by the external and internal teeth. Circular curves 20 and 21 show the path taken by the interior teeth 11; and elliptical curves 22 and 23 show the path taken by the external teeth 9.

More particularly, curve 20 is the locus of points assumed by each of the root or base portions of the teeth of the set of internal teeth 11; and curve 21 is the locus of points assumed by each of the head or top portions of the teeth of the set of internal teeth 11.

In addition, curve 22 is the locus of points assumed by each of the head or top portions of the teeth of the set of exterior teeth 9; and curve 23 is the locus of points assumed by each of the root or base portions of the teeth of the set of exterior teeth 9. Both curves 22 and 23 are elliptical, because of the eccentricity imparted to the flexible sleeve 7, as previously described. All of the base portions, and head portions have been indicated in FIG. 1.

The transmission of the shape of the eccentric element 5 to the flexible sleeve 7 need not be via the disclosed eccentric element or wave generator which rotates about a stationary axis of symmetry. It can also be realized by means of a rolling element which rolls in a circular path. Electrical machines operating on this principle which can be utilized in the context of the present invention are described in an article in the Journal "Elektrotechnik und Maschinenbau", Vienna, Apr. 1, 1961, vol. 78, page 7. The axis of symmetry in such machines coincides with the cone-axis or cylinder-axis of the circular path, and the axis of the rolling element orbits about the cone-axis or cylinder-axis.

The rotor 3 of the power unit may be of a reluctance- or reactance-type armature.

The elastic, flexible sleeve may be constituted of any natural rubber elastomer material, nylon or other synthetic plastic material, or any other flexible material (including metals) which is non-magnetic.

It will be understood that each of the elements described above, or two or more together, may also find a useful application in other types of constructions differing from the types described above.

While the invention has been illustrated and described as embodied in a transmission system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a transmission system, a combination comprising an input shaft mounted for rotation about an axis; drive means for rotating said input shaft at a predetermined speed, including an electrical machine having opposite axial ends, a rotor mounted on said shaft for rotation therewith, and a stator surrounding said rotor and defining a cylindrical air gap therewith; a hollow output member mounted for rotation about said axis and means journalling a portion of said input shaft coaxially within said output member for rotation relative thereto; and step-down gearing means for rotating said output member at a speed less than said predetermined speed, including a rotary flexible non-magnetic cylindrical sleeve radially spaced from said stator and having an end region connected with said output member axially adjacent one of said axial ends of said electrical machine, another end region at the other of said axial ends of said electrical machine and having a first annular set of teeth on an outer circumferential region of said sleeve, and an intermediate region surrounding said rotor and extending through said gap, means for flexing said sleeve, including an eccentric element mounted on said shaft axially adjacent said other axial end of said electrical machine in juxtaposed relationship with said first set of teeth for rotation within said sleeve and for imparting the eccentricity of said eccentric element to said first set of teeth on said sleeve as said shaft rotates, anti-friction bearing means interposed between said sleeve and said eccentric element, and an annular reaction member axially aligned with and connected to said stator at said other axial end of said electrical machine, said reaction member having a second annular set of teeth on an inner circumferential region of said annular reaction member and being in meshing engagement with said first set, said second set having a greater number of teeth than said first set for permitting rotation of said output member at a speed lower than said predetermined speed of said input shaft.

2. In a transmission system, a combination comprising a housing; an input shaft mounted on said housing for rotation about an axis; drive means for rotating said shaft at a predetermined speed, including an electrical machine having opposite axial ends, a rotor mounted on said shaft for rotation therewith, and a stator surrounding said rotor and defining a cylindrical air gap therewith; a hollow output member mounted on said housing for rotation about said axis and means journalling a portion of said input shaft coaxially within said output member for rotation relative thereto; and step-down gearing means for rotating said output member at a speed less than said predetermined speed, including a rotary flexible sleeve having an end region connected with said output member axially adjacent one of said axial ends of said electrical machine, another end region at the other of said axial ends of said electrical machine and having a first annular set of teeth on an outer circumferential region of said sleeve, and an intermediate region surrounding said rotor and extending through said gap, means for flexing said sleeve, including an eccentric element mounted on said shaft axially adjacent said other axial end of said electrical machine in juxtaposed relationship with said first set of teeth for rotation within said sleeve and for imparting the eccentricity of said eccentric element to said first set of teeth on said sleeve as said shaft rotates, and an annular reaction member mounted on said housing so as to be stationary relative thereto and surrounding said other end region of said sleeve at said other axial end of said electrical machine, said reaction member having a second annular set of teeth on an inner circumferential region of said reaction member and being in meshing engagement with said first set, said second set having a greater number of teeth than said first set for permitting rotation of said output member at a speed lower than said predetermined speed of said input shaft.

3. A transmission system as defined in claim 2; and further comprising anti-friction bearing means interposed between said sleeve and said eccentric element.

4. A transmission system as defined in claim 3, wherein said anti-friction bearing means are ball bearings.

5. A transmission system as defined in claim 2, wherein said electrical machine has a reluctance-type armature.

6. A transmission system as defined in claim 2, wherein said flexible sleeve is constituted by non-magnetic elastic material.

* * * * *